United States Patent

Ruedisueli et al.

[11] Patent Number: 5,838,819
[45] Date of Patent: Nov. 17, 1998

[54] SYSTEM AND METHOD FOR PROCESSING AND MANAGING ELECTRONIC COPIES OF HANDWRITTEN NOTES

[75] Inventors: Laurence W. Ruedisueli, Berkeley Heights; Gordon Thomas Wilfong, Gillette, both of N.J.

[73] Assignee: Lucent Technologies Inc., Murray HIll, N.J.

[21] Appl. No.: 557,872

[22] Filed: Nov. 14, 1995

[51] Int. Cl.[6] ..................................... G06K 9/00
[52] U.S. Cl. .................... 382/187; 382/190; 345/179; 707/525; 707/541
[58] Field of Search ..................... 382/187, 188, 382/189, 190, 181, 306, 313, 175, 309; 345/173, 179; 707/541, 350, 500, 507, 508, 511, 512, 525

[56] References Cited

U.S. PATENT DOCUMENTS

| | | | |
|---|---|---|---|
| 4,633,436 | 12/1986 | Flurry | 364/900 |
| 4,912,640 | 3/1990 | Tsugei | 364/400 |
| 5,063,600 | 11/1991 | Norwood . | |
| 5,113,041 | 5/1992 | Blonder et al. . | |
| 5,113,042 | 5/1992 | Mletzko . | |
| 5,202,197 | 4/1993 | Ansell et al. . | |
| 5,243,149 | 9/1993 | Comerfor | 178/18 |
| 5,319,721 | 6/1994 | Chefalas et al. . | |
| 5,329,625 | 7/1994 | Kannan et al. . | |
| 5,333,209 | 7/1994 | Sinden et al. . | |
| 5,339,412 | 8/1994 | Fueki | 382/306 |
| 5,341,503 | 8/1994 | Gladstein et al. . | |
| 5,347,295 | 9/1994 | Aguinick et al. | 345/156 |
| 5,349,668 | 9/1994 | Gladstein et al. . | |
| 5,357,061 | 10/1994 | Crutchfield . | |
| 5,369,704 | 11/1994 | Bennett et al. . | |
| 5,392,387 | 2/1995 | Fitzpatrick et al. | 395/156 |
| 5,404,458 | 4/1995 | Zetts | 395/275 |
| 5,420,943 | 5/1995 | Mak | 382/313 |
| 5,459,796 | 10/1995 | Boyer | 382/187 |
| 5,524,201 | 6/1996 | Schwartz | 707/500 |
| 5,586,235 | 12/1996 | Kauffman | 395/761 |
| 5,587,560 | 12/1996 | Crooks et al. | 178/18 |
| 5,596,350 | 1/1997 | Capps et al. | 382/188 |
| 5,612,720 | 3/1997 | Ito et al. | 345/179 |
| 5,631,741 | 5/1997 | Matthews | 358/296 |

OTHER PUBLICATIONS

Paperport User's Guide—Paperport For Macintosh, Visioneer Communications, Inc., 1994, pp. iii–vi, 7–10,31–33, 59–68, 75–80, 87, and 93–112.

*Primary Examiner*—Edward L. Coles
*Assistant Examiner*—Madeleine Anh-Vinh Nguyen

[57] ABSTRACT

A system and method for processing and managing electronic copies of handwritten notes are provided. The system includes a processor for processing the handwritten notes to generate the electronic copies, with each electronic copy associated with a respective identifier corresponding to at least one set of the respective handwritten notes, in which the identifiers facilitate the management of the electronic copies. The system includes an electronic notepad and can also include devices operatively connected to the electronic notepad for operating with the electronic notepad to receive, manage, merge, and/or display the electronic copies from the electronic notepad.

29 Claims, 7 Drawing Sheets

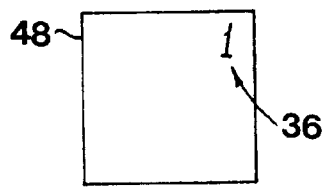
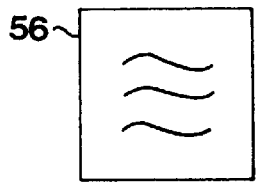
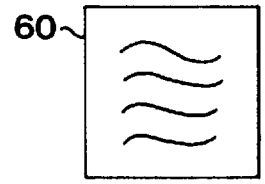
Fig. 5a  Fig. 6a  Fig. 7a
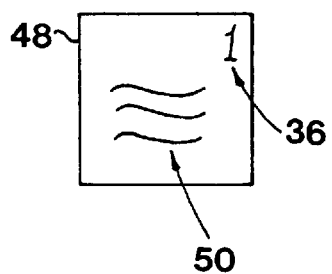
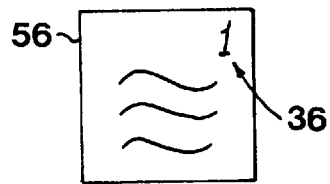
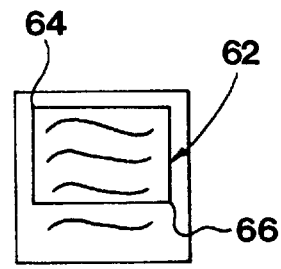
Fig. 5b  Fig. 6b  Fig. 7b
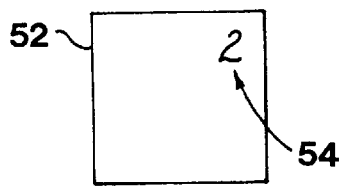
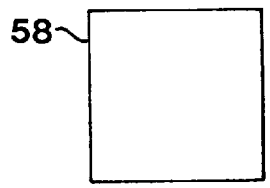
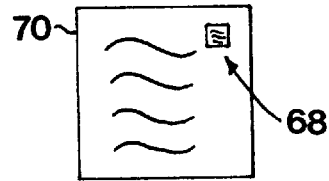
Fig. 5c  Fig. 6c  Fig. 7c

10
SYSTEM AND METHOD FOR PROCESSING AND MANAGING ELECTRONIC COPIES OF HANDWRITTEN NOTES

BACKGROUND INFORMATION

1. Technical Field

This disclosure relates to information processing, and more particularly, to a system and method for processing and managing multiple pages of handwritten notes in electronic form.

2. Description of the Related Art

Recently, a number of electronic/computer-based notepads using pen-based computers and/or tablets have been developed and marketed as personal digital assistants such as the "NEWTON" available from "APPLE". These personal digital assistants can be portable and generally do not use relatively bulky input devices such as a keyboard or a mouse.

Some electronic notepads can be used to analyze, recognize, and/or convert handwritten information into digital text. An example of such an electronic notepad is disclosed in U.S. Pat. No. 5,329,625 to Kannan et al. Other electronic notepads can involve the simple capture of handwritten notes and sketches, i.e. handwriting and symbol recognition are not required. Thus such handwriting-capturing devices can be implemented in simpler and less expensive forms.

One type of electronic notepad provides for both a standard ink and paper copy as well as an electronic copy, with actual paper and/or a stack or pad of paper positioned over a handwriting-capturing device such as a capacitance sensitive, pressure-sensitive, touch-sensitive, or proximity-sensing tablet. Such handwriting-capturing tablets are known in the art, such as the information processing tablet described in commonly assigned U.S. Pat. No. 5,113,041, which is incorporated herein by reference.

In using such an electronic notepad, the tracking of correct correspondences between the paper copies of notes and the electronic copies can pose difficulties. One difficulty sometimes occurs when a user intends to position a new sheet of paper on the tablet. Typically, the electronic notepad has to be instructed when to close or end the current electronic page and when to open or create a new page. Another difficulty occurs if the user attempts to return to a previous sheet to modify previously stored electronic notes. A set of buttons, sensors, or icons, implemented in hardware and/or software in the electronic notepad, can be provided for receiving signals from the user indicating the desired page. Such implementations can increase the complexity of use and the expense of the device.

SUMMARY

It is recognized that a system and method for managing pages electronically stored in an electronic notepad can be implemented in a relatively simple and inexpensive manner to improve such note-taking capabilities. An electronic notepad for managing electronic copies of handwritten notes is disclosed, which includes a processor for processing the handwritten notes to generate the electronic copies.

Each electronic copy is associated with a respective identifier corresponding to at least one set of the respective handwritten notes, in which the identifiers facilitate the management of the electronic copies. The system includes an electronic notepad and can also include devices operatively connected to the electronic notepad for operation therewith to receive, manage, merge, and/or display the electronic copies from the electronic notepad.

In an illustrative embodiment, a handwriting capturing device having a surface is used for generating data signals from sequences of x-y coordinates of a pen device employed substantially close to the surface. The sequences of x-y coordinates correspond to a plurality of sessions of handwritten notes written substantially adjacent the surface on a plurality of pages.

Each session corresponds with a time period during which a collection of notes are made without being interrupted for the purpose of making a second collection of notes. Each session of handwritten notes includes a handwritten page identifier, and the data signals include a respective electronic identifier corresponding to a respective handwritten page identifier. The electronic identifiers of the plurality of sessions facilitate the management of the electronic copies, such as the collecting together and merging of sessions having similar identifiers.

Thus, the tracking of correct correspondences between the paper copies of notes and the electronic copies can be performed without requiring the closing of a current electronic page or the opening or creation of a new page.

The disclosed electronic notepad using identifiers of sessions allows a user to return to a previous sheet of handwritten notes to modify previously stored electronic notes without requiring additional buttons, sensors, or icons. Thus the storage and management of handwritten notes in electronic form can be implemented in a simple manner with minimal manufacturing expense.

BRIEF DESCRIPTION OF THE DRAWINGS

The features of the disclosed electronic notepad system and method will become more readily apparent and can be better understood by referring to the following detailed description of an illustrative embodiment, taken in conjunction with the accompanying drawings, where:

FIGS. 5–7 illustrate alternative modes of operation using page identifiers;

DESCRIPTION OF THE PREFERRED EMBODIMENTS

Figure 1:
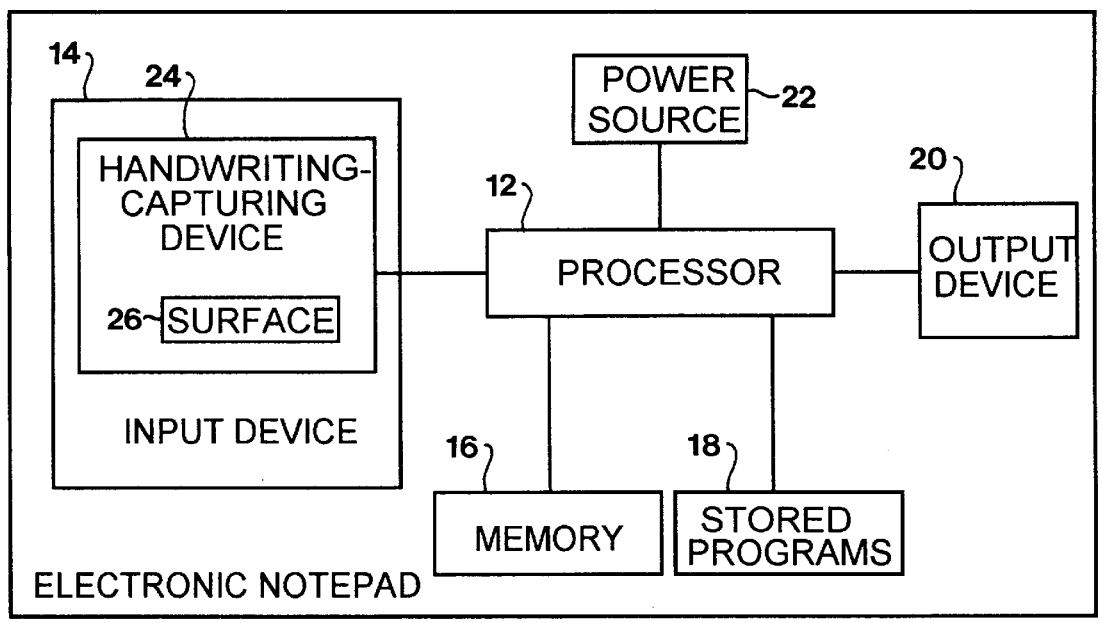
FIG. 1 is a block diagram of the components of the disclosed electronic notepad.

Referring now in specific detail to the drawings, with like reference numerals identifying similar or identical elements, as shown in FIG. 1, the present disclosure relates to an electronic notepad system and method of use for managing pages electronically stored therein. The electronic notepad system includes: electronic notepad 10 having processor 12 operatively connected to input device 14; memory 16; stored programs 18; and output device 20. Power source 22 is also provided, which can include a power adapter and/or a battery to allow electronic notepad 10 to be portable.

In an exemplary embodiment, processor 12 can be, for example, a 16C57 microprocessor available from "MICROCHIP", and memory 16 can include about 128 kilobytes of random access memory. Such components implement electronic notepad 10 with relatively low power consumption and at relatively low cost. Alternatively, electronic notepad 10 can be implemented using a "PENTIUM", available from "INTEL", as processor 12. Memory 16 can include about 8 megabytes of random access memory.

Electronic notepad 10 can store several written pages of notes in one data file representing electronic pages or sessions of handwriting in electronic notepad 10 until the data file is downloaded, for example, into the memory of a computer system such as a personal computer or a control box. The control box can include a memory buffer for subsequent processing, as described in greater detail below.

Input device 14 includes handwriting capturing device 24 having operative surface 26 for receiving the handwritten notes and other data and commands from the user. Input device 14 can also include additional buttons and devices, such as a mouse, for supplementing the functions of surface 26.

Output device 20 can include at least one data port and/or a transmitter for outputting the data files during a download mode. Output device 20 can also include a display and can be combined, at least in part, with input device 14 to provide a display for interactive operation.

Figure 2:
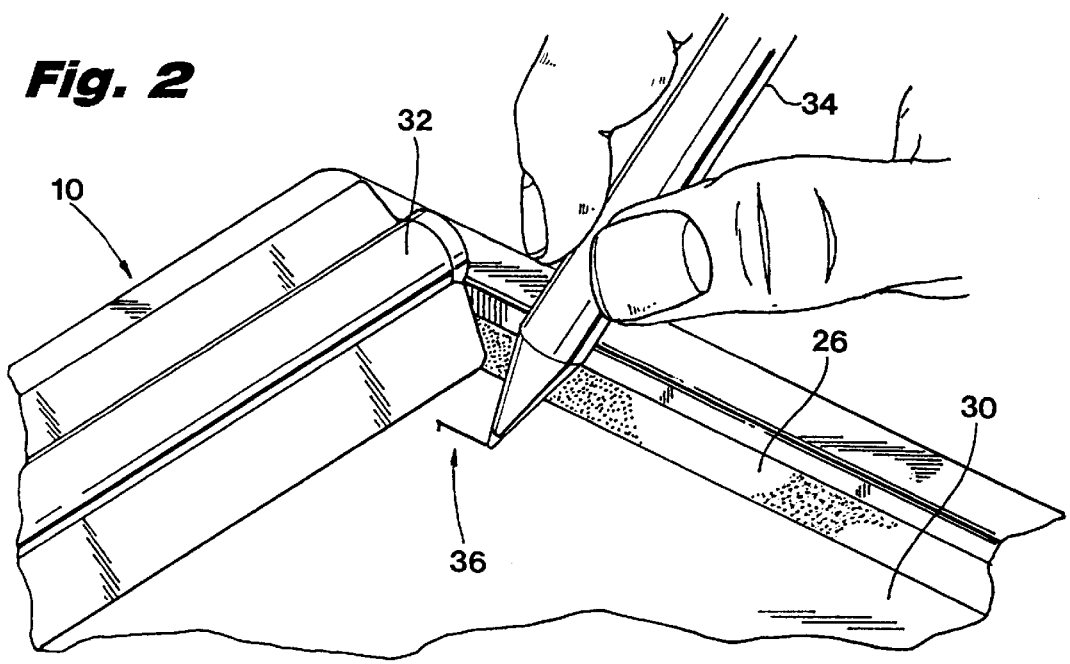
FIG. 2 illustrates a page notation being transcribed on a sheet of paper on the disclosed electronic notepad.
Figure 3:
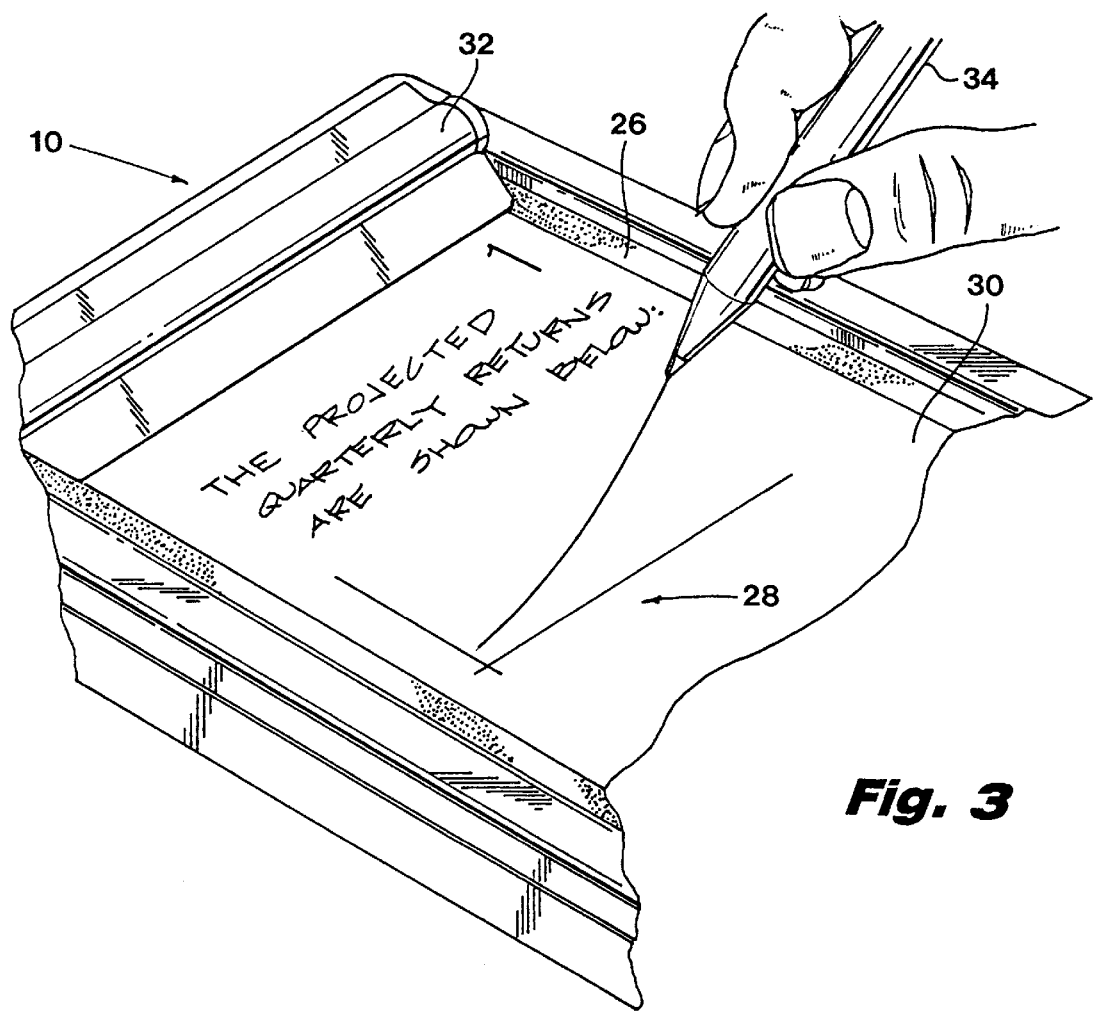
FIG. 3 illustrates the disclosed electronic notepad of FIG. 2 having notes being transcribed on the paper.

Stored programs 18 can be compiled or interpreted from source code written, for example, in C++. These programs are executed by processor 12 to perform the disclosed electronic notepad system and method for detecting, collecting, and managing the handwritten pages in a relatively simple and inexpensive manner to be electronically stored in memory 16 and to facilitate note-taking. As shown in FIGS. 2–3, electronic notepad 10, using processor 12 executing stored programs 18, electronically captures handwritten notes 28 written by the user on sheet of paper 30. Paper 30 is attached by clip 32 to electronic notepad 10, with handwritten notes 28 written, for example, using pen 34. Pen 34 can be incorporated into input device 14.

For clarity of explanation, the illustrative embodiment of the disclosed electronic notepad system and method is presented as having individual functional blocks, which can include functional blocks labelled as "processor" and "processing unit". The functions represented by these blocks can be provided through the use of either shared or dedicated hardware, including, but not limited to, hardware capable of executing software. For example, the functions of the processor and processing unit presented herein can be provided by a shared processor or by a plurality of individual processors.

Moreover, the use of the functional blocks with accompanying labels herein is not to be construed to refer exclusively to hardware capable of executing software. Illustrative embodiments can include digital signal processing hardware, such as the AT&T DSP16 or DSP32C, read-only memory for storing software performing the operations discussed below, and random access memory for storing digital signal processing results. Very large scale integration hardware embodiments, as well as custom very large scale integration circuitry, in combination with a general purpose digital signal processing circuit, can also be provided. Any and all of these embodiments fall within the meaning of the labels for the functional blocks as used herein.

Processor 12 is also capable of interfacing with external devices for downloading the electronically captured pages. In the disclosed electronic notepad method, a user controls the management of electronically captured pages for identifying and ordering both paper pages and the corresponding electronic pages. Such management of the electronically captured pages can be implemented in a natural manner; for example, by marking the upper right corner of handwritten page 30 with identifier 36, as shown in FIG. 2. This identifier 36 is then captured as an electronic identifier on the electronic page. Subsequent notes 28 can then be written, as shown in FIG. 3, for electronic storage and association with identifier 36.

Figure 4:
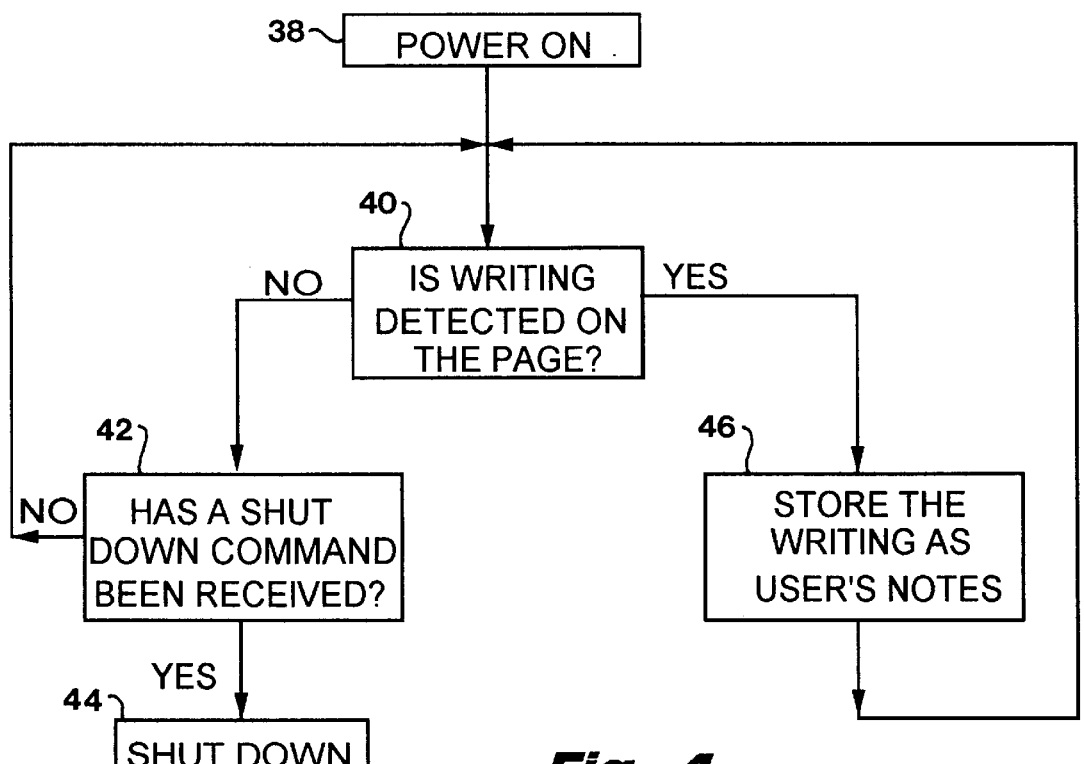
FIG. 4 is a flowchart of the method of operation of the disclosed electronic notepad system.

A flowchart of the operation of the disclosed electronic notepad system and method is shown in FIG. 4. After power is turned on in step 38, processor 12 determines if any writing by the user in step 40 is detected by surface 26. If no writing is detected after a predetermined period of time; for example, one minute, processor 12 determines if a shutdown command has been received by the user in step 42. Upon receiving a shutdown command in step 42, processor 12 enters a shutdown mode in step 44, in which open files are closed and any previous writing by the user is stored in a data file. If a shutdown command has not been received in step 42, processor 12 loops back to wait for writing in step 40. In looping back and waiting, processor 12 can optionally enter a power-saving mode in a manner known in the art.

Upon detection of writing in step 40, processor 12 stores in memory 16 the pen strokes corresponding to the writing as the user's notes in a time-contiguous collection or session of handwriting data points. These data points are typically a sequence of x-y coordinates used in orienting the detection of the writing on paper 30. After the writing is stored in memory 16, processor 12 loops back to execute step 40 to wait for additional writing.

Any pen strokes in the upper right corner correspond to a user-specified identifier, such as shown in FIGS. 2–3. This is particularly adaptable for providing user-drawn icons as well as for using non-Roman alphabetical characters and notations for such languages as Arabic and Hebrew; accented characters and notations such as a cedilla; as well as multi-character languages such as Japanese and Chinese.

Identifier 36 can be implemented, for example, by accepting the writing in the upper right corner to be the associated identifier; i.e. such writing can be stored as an image, such as a bitmap, and accessed by, for example, a computer system with the image of the identifier acting as an icon. In addition, the writing in the upper right corner can act as an indicator to electronic notepad 10 to generate a successive number or letter, such as "1", "2", etc., to establish an order between stored electronic pages. Each writing can also be imaged; for example, bitmapped, and indexed by such generated numbers.

Other identifiers can be generated using the computer system by graphically shrinking or scaling the currently stored electronic page, corresponding to written notes, to an image, such as a bitmap, which can then be used as an icon. In addition, electronic notepad 10 can support a keyview feature in which the user specifies, by a command or predetermined set of pen strokes, a portion or all of the currently stored electronic page to be graphically shrunk or scaled to be the image. The identifier can also be generated by a timestamp using a timer associated with processor 12 in FIG. 1.

Furthermore, the identifier can be generated by incorporating a telephone number obtained through a connection with a telephone using, for example, caller identification for use with an incoming call, a dialed telephone number for use with an outgoing call, or a specified speed-dial number stored in a memory of a telephone operatively connected to electronic notepad 10. Thus handwritten notes taken during a telephone conversation can be identified by the telephone number of another party in the conversation. Still further, input device 14 of electronic notepad 10 can incorporate a microphone and/or video connection for generating multimedia identifiers, in a manner known in the art.

The operation of the method described above and as shown in FIG. 4 is further illustrated in FIGS. 5–7 to provide alternative modes of generating identifiers of handwritten notes. As shown in FIG. 5(a), in one embodiment blank page 48 has identifier 36 written thereupon in the upper right corner, for example, by writing a "1". In FIG. 5(b), notes 50 written on page 48 outside the upper right corner can then be taken and stored progressively in memory 16. The actual writing on sheet of paper 30 over surface 26 is illustrated in FIGS. 2–3, with FIG. 2 corresponding to FIG. 5(a) and FIG. 3 corresponding to FIG. 5(b). The entry of the "1" in the upper right corner as identifier 36 indicating the beginning of note-taking on sheet of paper 30, represented in FIGS. 5(a) and 5(b) as page 48.

In FIG. 5(c), after changing to next sheet 52 of paper, the writing of new identifier 54, for example, "2" in the upper right corner, indicates a page change. Thus, pre-entry identification is supported, with each page identified initially, and new writing in the upper right corner signalling electronic notepad 10 of a new page of handwritten notes.

As shown in FIG. 6(a), another embodiment has sheet 56 of paper filled with notes, and then, in FIG. 6(b), the writing of "1" as identifier 36 in the upper right corner indicates a page change, so the entire page of notes 56, including identifier 36, is stored in memory 16. A new blank sheet of paper 58 is then used, as shown in FIG. 6(c). Thus, post-entry identification is supported, with each page being identified after the page is filled with notes.

As shown in FIG. 7, a further embodiment illustrates the keyview feature implemented by a computer system, which can optionally be operated interactively with electronic notepad 10 to identify electronic pages. Electronic page 60, which can be displayed to the user by the computer system, is shown in FIG. 7(a) as being filled with data corresponding to handwritten notes. A predetermined set of user inputs activates a keyview procedure in the computer system to determine a set of notes to be used as a keyview identifier. For example, the predetermined set of user inputs can be input by a mouse to sweep bounded region 62 on the display, or by positioning pen 34, for example, for about 2 seconds on a predetermined location on paper 30.

The user then enters user inputs to specific locations bounding a user-specified region of notes. For example, the user can specify two locations 64, 66 corresponding to locations in the electronic copy, as shown in FIG. 7(b), to block off specific notes, with the specific notes thus bordered by a rectangular box as region 62 defined by opposing corner locations 64, 66.

Electronic notepad 10 then automatically generates the identifier for the entire electronic page, as shown in FIG. 7(c), by graphically shrinking the specified notes in region 62 as image 68, and then positioning the image in the upper right corner to generate identified electronic page 70.

The keyview feature can be performed by predetermined keys and/or a mouse operatively connected to electronic notepad 10; for example, a mouse and keyboard can be included in the computer system to interactively select the specific notes.

To add additional notes to be associated with a previously written sheet of paper, the user can replace sheet of paper 30 in clip 32 to be positioned over surface 26, or otherwise the user can use a new sheet of paper thus positioned. The user can then repeat identifier 36 in the upper right corner of the positioned sheet. If the previously written sheet is so positioned, the user can trace over an existing identifier on that sheet.

Electronic notepad 10 stores every session of handwritten notes in a single data file in memory 16. A session corresponding to additional notes are stored in a separate section of the single data file, and with each session included in an electronic page corresponding to a page of notes identified with a respective identifier. Even though the identifiers of the different electronic pages can appear somewhat different, although intended to be the same identifier for both sheets of notes, even when tracing is performed, the disclosed electronic notepad system and method is capable of recognizing both identifiers as being substantially identical and then to merge the respective electronic pages, as described below.

Figure 8:
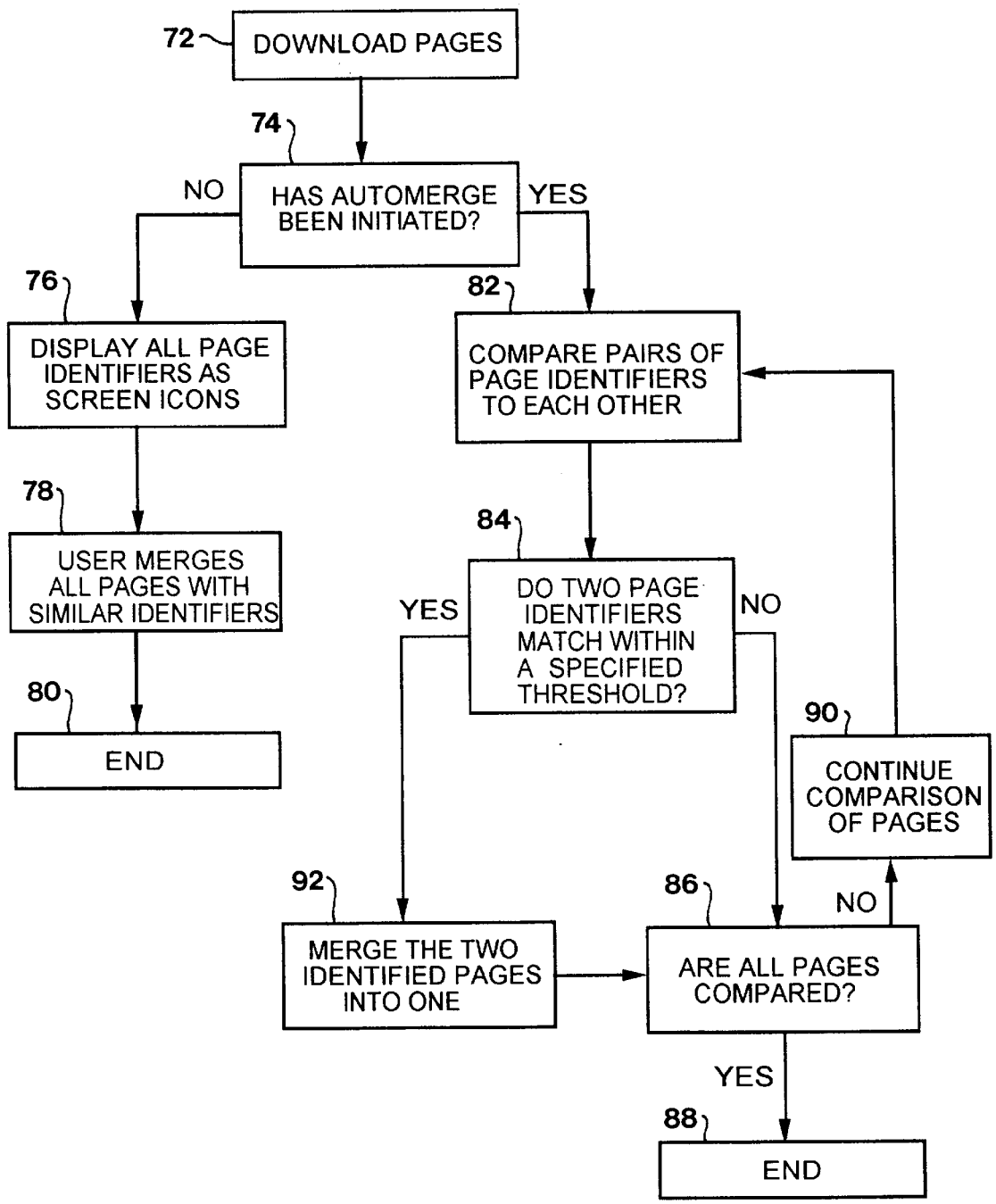
FIG. 8 is a flowchart of the disclosed method for performing a download and merge function.

FIG. 8 illustrates a typical download and merge operation used in the disclosed electronic notepad system and method, which is performed, for example, by an externally connected computer system. Electronic notepad 10 can be operatively connected to a processing unit of a computer system, with both electronic notepad 10 and the computer system having appropriate software to interface together and to transfer electronic pages; for example, in a download/upload operation, respectively, in step 72. The transferred electronic pages of notes in electronic notepad 10 are then stored in a data file in a memory of the computer system. It is also contemplated that electronic notepad 10 can upload electronic pages as well, and optionally display and annotate such electronic pages in a manner as described above.

After the download is performed in step 72, the computer system determines in step 74 if an automatic merging procedure or automerge has been initiated by the user, or alternatively if the computer system has been preselected to execute the automerge procedure automatically. If automerge has not been initiated in step 74, all electronic page identifiers are displayed on a display as screen icons in step 76. The user can indicate at least two icons as corresponding to notes belonging to the same electronic page, and then merge all such pages with similar identifiers in step 78. Upon completing the merging of all pages with similar identifiers, the merging procedure ends in step 80.

If automerge has been initiated in step 74, pairs of page identifiers are compared in step 82, and the pairs of page identifiers are checked whether they match within a specified or predetermined threshold in step 84. If the two page identifiers do not match, the merge procedure branches to perform steps 86–90 to complete the comparison of pages.

If the two page identifiers do match in step 84, the merge procedure then branches to perform step 92 to merge the two identified pages into one electronic page; for example, the data files of each electronic page can be appended. The merged electronic pages can then be stored in a separate file and identified with at least one of the page identifiers, as either one of the specified matching page identifiers representing the information stored in the separate file.

The merge procedure then determines in step 86 if all of the electronic pages have been compared. If all have been compared, then the merge procedure ends in step 88;

otherwise, the merge procedure continues the comparison of pages by looping back to perform step 82.

Each electronic page can correspond to a session $S_j$ of time-contiguous writing associated with an identifier $I_j$, which is included, for example, at the beginning of the data file of the session. For a pair of sessions $S_j$, $S_k$ with identifiers $I_j$, $I_k$, respectively, the comparison in step 82 produces a value $\rho(I_j,I_k)$ which can be, for example, between 0 and 1, which is a measure of the similarity of the identifiers $I_j$, $I_k$. For example, a value of $\rho(I_j,I_k)$ closer to 1 indicates that the identifiers $I_j$, $I_k$ are more similar to each other. Such similarity measures for all pairs of identifiers are used to merge the corresponding sessions having identifiers sufficiently similar to each other.

Clustering techniques and other methods known in the art can also be used, including pattern recognition methods, neural networks, and fuzzy logic. In an exemplary embodiment, the comparison in step 82 uses a predetermined threshold $\epsilon$, such that $\rho(I_j,I_k)>\epsilon$ indicates sufficient similarity. In one embodiment, $\epsilon$ is about 0.87.

The original electronic page can include sessions $S_1$, $S_2$, ..., $S_m$, so downloading step 72 can create m electronic pages with each page including one session. For k=1, 2, ..., m, and for each j with k<j≦m, if $S_j$ and $S_k$ are not currently in the same electronic page, $\rho(I_j,I_k)$ is determined, and the merging of the electronic pages including $S_j$, $S_k$ occurs if $\rho(I_j,I_k)>\epsilon$. This results in n pages, with n≦m such that the n pages have the property that if $\rho(I_j,I_k)>\epsilon$, then sessions $S_j$, $S_k$ are in the same page.

Any similarity measures can be implemented, such as correlation factors known in the art; for example, using scalar products of vectors representing coordinate samples between compared identifiers. The comparison can also involve symbol recognition of the compared identifiers, which can be implemented as described in commonly assigned U.S. Pat. No. 5,333,209, which is incorporated herein by reference.

Even though two or more sessions can be merged together into a single electronic page, they can subsequently be separated by using a split page procedure, known in the art, if a particular merge is not desired. The user can also vary the threshold value $\epsilon$, for example, to conform to the quality of the user's penmanship or the type of identifiers or notes being created by the user using electronic notepad 10, such as icons or complicated symbols which can be difficult to match by similarity measures using relatively high values of $\epsilon$. On the other hand, if two or more different identifiers are somewhat similar, then a higher value of $\epsilon$ can be required to prevent incorrect merges.

In another embodiment, the automerge procedure can be one of stored programs 18 of electronic notepad 10, which can be executed continuously as a background task. Whenever the user specifies a new identifier, processor 12 of electronic notepad 10 can automatically compare the new identifier with the identifiers previously stored for previous electronic pages. A match of identifiers can indicate that the user has returned to a previously written page. If a match occurs, any writing associated with the new identifier can be added to the previous electronic page with the overall electronic page including such writings being associated with one of the matched identifiers.

In a further embodiment, all matching identifiers can be stored and compared with other identifiers to ensure that each combination of identifiers is ascertained as matching or non-matching. Once all identifiers have been compared with each other, a single identifier of each set of matched identifiers can be associated with all merged electronic pages. Alternatively, a set of matching identifiers can themselves be merged or correlated to generate a generic matching identifier which is then associated with the merged electronic pages.

Figure 9:
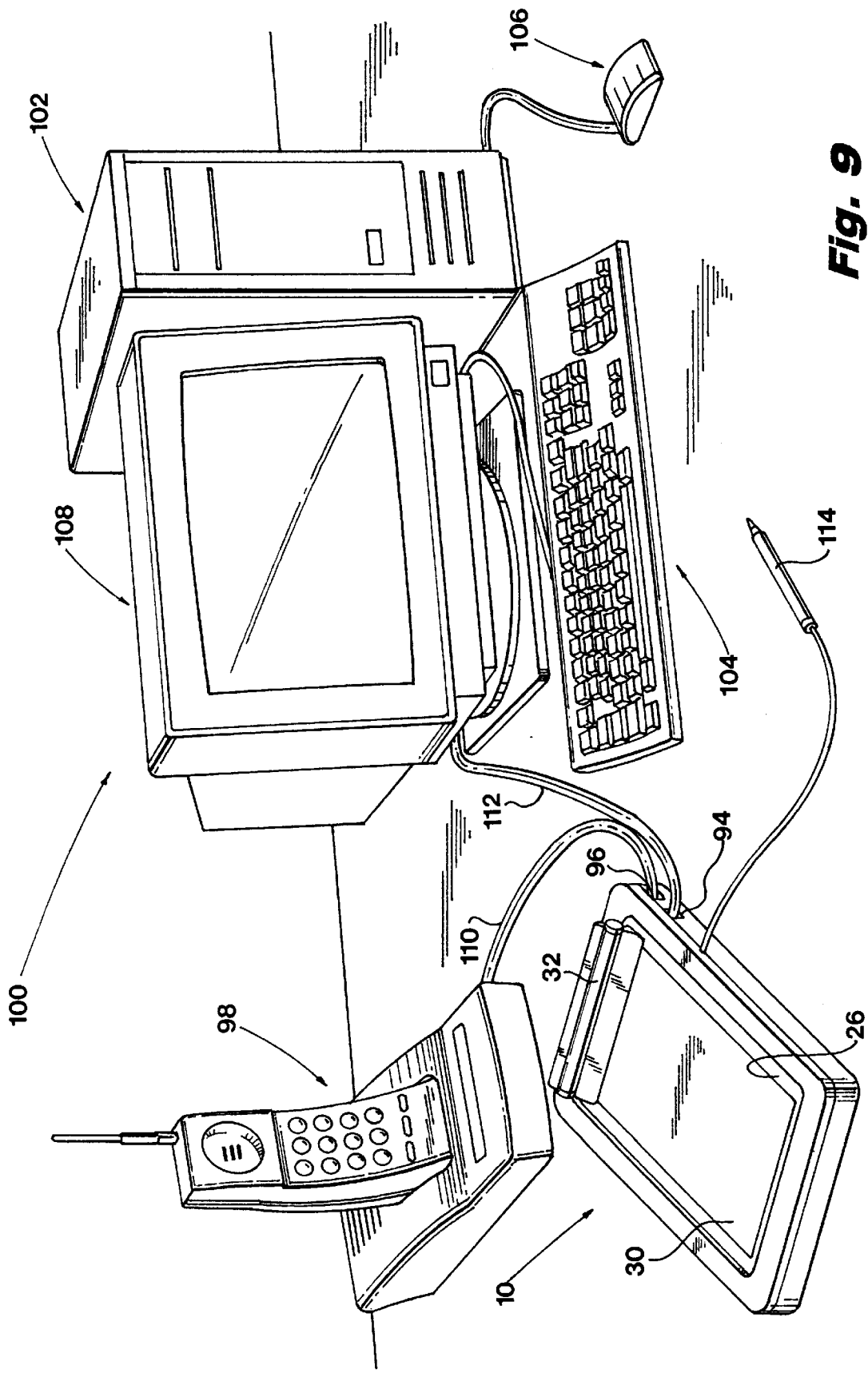
FIG. 9 illustrates an embodiment of a disclosed electronic notepad system.

The disclosed electronic notepad system and method can be implemented as shown in FIGS. 9–12. Referring to FIG. 9, electronic notepad 10 can have at least one port, such as ports 94, 96, to be operatively connected to equipment such as telephone 98 and/or computer system 100 including processing unit 102, input devices such as keyboard 104 and mouse 106, and output devices such as display 108 or a printer (not shown).

In the embodiment shown in FIG. 9, electronic notepad 10 is connected by wires or cables 110, 112, respectively, to telephone 98 and processing unit 102 using, for example, serial ports and connections. It is understood that telephone 98 can be connected directly to computer system 100. Electronic notepad 10 and computer system 100 can thus be connected to the telephone lines through telephone 98 and/or to a modem operatively connected to or internal to computer system 100. Such connections through telephone 98 or through a modem can, for example, provide basic telephone functions, as well as incorporate messages and timestamps of the electronic pages to be included in a corresponding data file transmitted from electronic notepad 10 to computer system 100.

Electronic notepad 10 can allow the user to write notes while speaking on telephone 98, to recall and display notes previously stored and downloaded electronically, and/or to search for earlier notes from stored electronic pages. For example, the electronic pages can include a caller's name or a particular time, and so the electronic pages can be searched for specific keywords, messages, or times. The connection of electronic notepad 10 to telephone lines can also allow the user to communicate remotely with other computer systems operatively connected to telephones or modems using electronic notepad 10.

Pen device 114, which includes pen 34, can be used with electronic notepad 10, with pen device 114 storing ink for writing notes to create handwritten notes, sketches, figures or any scribbling, without electronic notepad 10 interfering with the natural action of the user in writing with a pen on a sheet of paper. Pen device 114 can be refillable; i.e. pen device 114 can have replaceable ink cartridges, or pen device 114 can include a clasp or other means known in the art for attaching and/or removing a writing pen to electronic notepad 10.

In one embodiment, shown in FIG. 9, pen device 114 can be attached to electronic notepad 10 by an inert cord or cable. Optionally, pen device 114 can be electronically connected to electronic notepad 10 by a signal-carrying cable for providing data signals to processor 12 of electronic notepad 10 for indicating, using a capacitance, pressure or proximity sensor or the like, when a writing end of pen device 114 is applied substantially adjacent to or removed from surface 26 of electronic notepad 10; for example, page of paper 30 positioned on electronic notepad 10.

Thus, sessions of handwritten notes can be indicated, for example, from a predetermined pause in the user's writing by removal of pen device 114 from paper 30, which causes removal of the end of pen device 114 from the handwriting-capturing device 24.

In one embodiment using a capacitance-sensitive surface as handwriting-capturing device 24, removal of the end of pen device 114 causes a capacitance effect with the capacitance-sensitive surface to be removed, thus signaling the removal of pen device 114.

In the embodiment shown in FIG. 9, processing unit 102 includes software for operating computer system 100 in either an interactive mode or a download mode with electronic notepad 10. In the interactive mode, computer system 100 can process signals from electronic notepad 10 corresponding to notes being written on paper positioned on electronic notepad 10, and computer system 100 outputs such notes in a real-time manner; for example, the notes are displayed electronically on display 108 as the notes are written. Alternatively, the notes can be printed using a printer (not shown) as the notes are written.

Electronic notepad 10 can store electronic pages in a single data file corresponding to respective pages of written notes, with the data file generated and stored as the written notes are written on paper 30 positioned on electronic notepad 10. Accordingly, the electronic pages can act in a manner similar to carbon copies for providing copies, in electronic form, of the handwritten notes on the sheets of paper substantially simultaneous with the writing of the notes. Thus, the risk of losing the user's notes by the loss of the corresponding sheets of paper is reduced.

In the exemplary embodiment, all electronic pages are stored in a single data file, but it is understood that each electronic page can be stored in a respective single data file, and also that multiple data files can be used to store a single electronic page.

In the download mode, electronic notepad 10, upon instruction from the user, can transmit the data files as signals to computer system 100 for storage in memory and/or output on display 108 or to a printer (not shown). The output of such data files as electronic pages can thus be effected in real-time or at a later time.

In this embodiment, each of the electronic pages generated by electronic notepad 10 from written notes can be associated with an identifier or indicia. Electronic notepad 10 can thus provide the electronic pages, including the associated identifiers, to computer system 100 which executes specialized software to manage the various electronic pages, as described below; for example, to maintain an order of the electronic pages corresponding to the order of the written notes, or to merge those electronic pages with similar identifiers.

Using commands from the user executed through keyboard 104 and mouse 106, computer system 100 can, for example, merge different electronic pages together, as in FIG. 8, or can separate an electronic page into multiple electronic pages. Computer system 100 can also automatically merge electronic pages following the download if the associated page identifiers are substantially similar. If any merging is done in error, computer system 100 can provide the user with the option of splitting merged electronic pages; for example, back to the original state of each electronic page involved in the merge.

Figure 10:
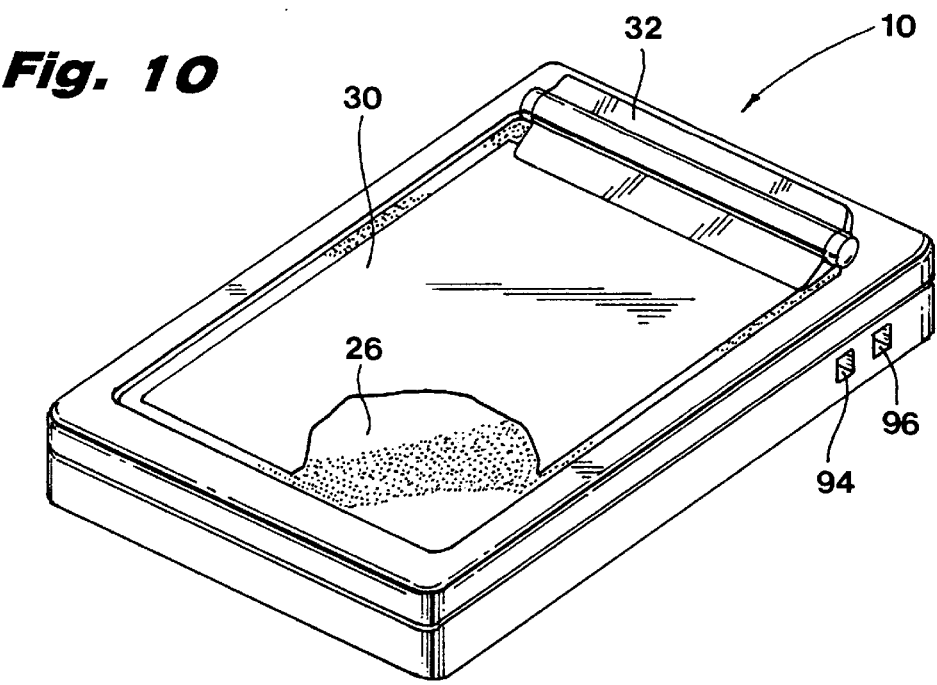
FIG. 10 illustrates a cut-away view of a disclosed electronic notepad.

As shown in greater detail in FIG. 10, electronic notepad 10 has means for attaching at least one sheet of paper substantially adjacent to electronic notepad 10. In one embodiment, the means for attaching is defined to be clip 32, as shown in FIGS. 2–3 and 9–10, for attaching and/or removing sheet of paper 30 to electronic notepad 10.

In particular, sheet of paper 30 is positioned substantially adjacent surface 26 of electronic notepad 10, as illustrated in the cut-away view in FIG. 10. Surface 26 is connected to or incorporated with handwriting-capturing device 24, and electronic notepad 10 includes a graphics tablet having microprocessors, memory, and associated electronics, described above in reference to FIG. 1, for obtaining and storing handwritten notes in memory 16.

In another embodiment, surface 26 of handwriting-capturing device 24 can include a display for displaying an electronic copy of the writing currently being placed on a particular page positioned substantially adjacent surface 26. Such a display can also output computer-generated menus, action icons such as up and down buttons, and other information to assist the user in capturing and managing the user's handwriting. For example, the display can have an overall length longer than, for example, a longest length of the sheets of paper, and so the display can output such menus and the like, for example, below the bottom edge of the sheets of paper to provide graphic information to the user in conjunction with the writing of notes upon the sheets of paper.

Electronic notepad 10 also includes at least one port such as data ports 94, 96 for attaching and/or removing at least one cable, such as cables 110, 112 in FIG. 9, for operatively connecting electronic notepad 10 to external devices such as telephone 98 and processing unit 102 of computer system 100. As shown in FIG. 10, pen device 114 is not required to be attached to electronic notepad 10, but a cable or cord can optionally be included to attach and/or remove pen device 114 to and from electronic notepad 10, as in FIG. 9.

Figure 11:
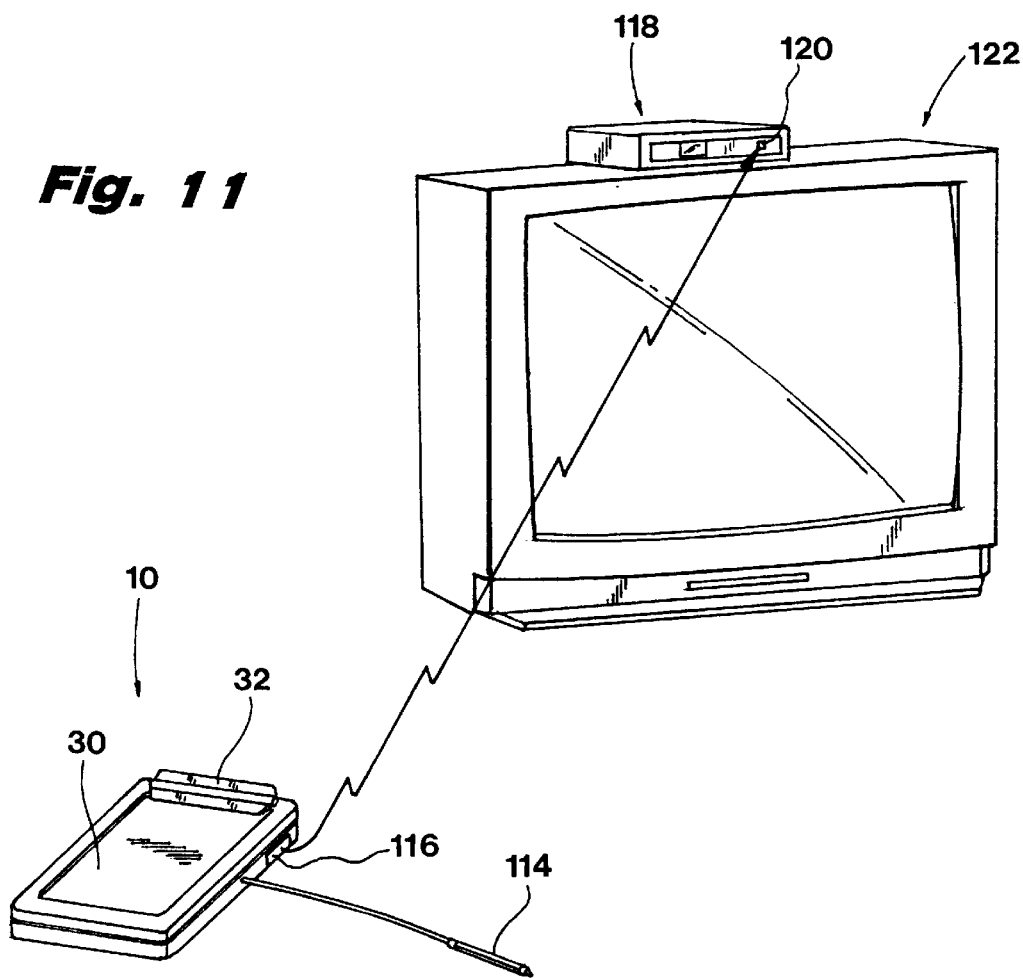
FIG. 11 illustrates the disclosed electronic notepad remotely linked to a display system.

In another embodiment shown in FIG. 11, electronic notepad 10 can include pen device 114 and clip 32 for holding paper 30, and also includes transmitter 116 for establishing a wireless channel to control box 118, such as a set-top box, having receiver 120 and operatively connected to display 122. Wireless transmitter 116 and receiver 120 can be implemented in a manner known in the art for transmitting signals using, for example, infrared, microwave and/or radio frequencies. Such signals can be used to transfer data corresponding to the electronic copy of the user's handwriting, and control box 118 processes such signals to generate an electronic copy of the user's handwriting in real-time or in a substantially concurrent manner on display 122.

Using this embodiment, electronic notepad 10, in conjunction with control box 118 having wireless receiver 120 and operatively connected to display 122, can provide substantially simultaneous viewing of the notes written by at least one user of a corresponding electronic notepad by an audience. In this configuration, electronic notepad 10 can be used in a classroom setting or in lieu of an overhead projector at a presentation or meeting.

Figure 12:
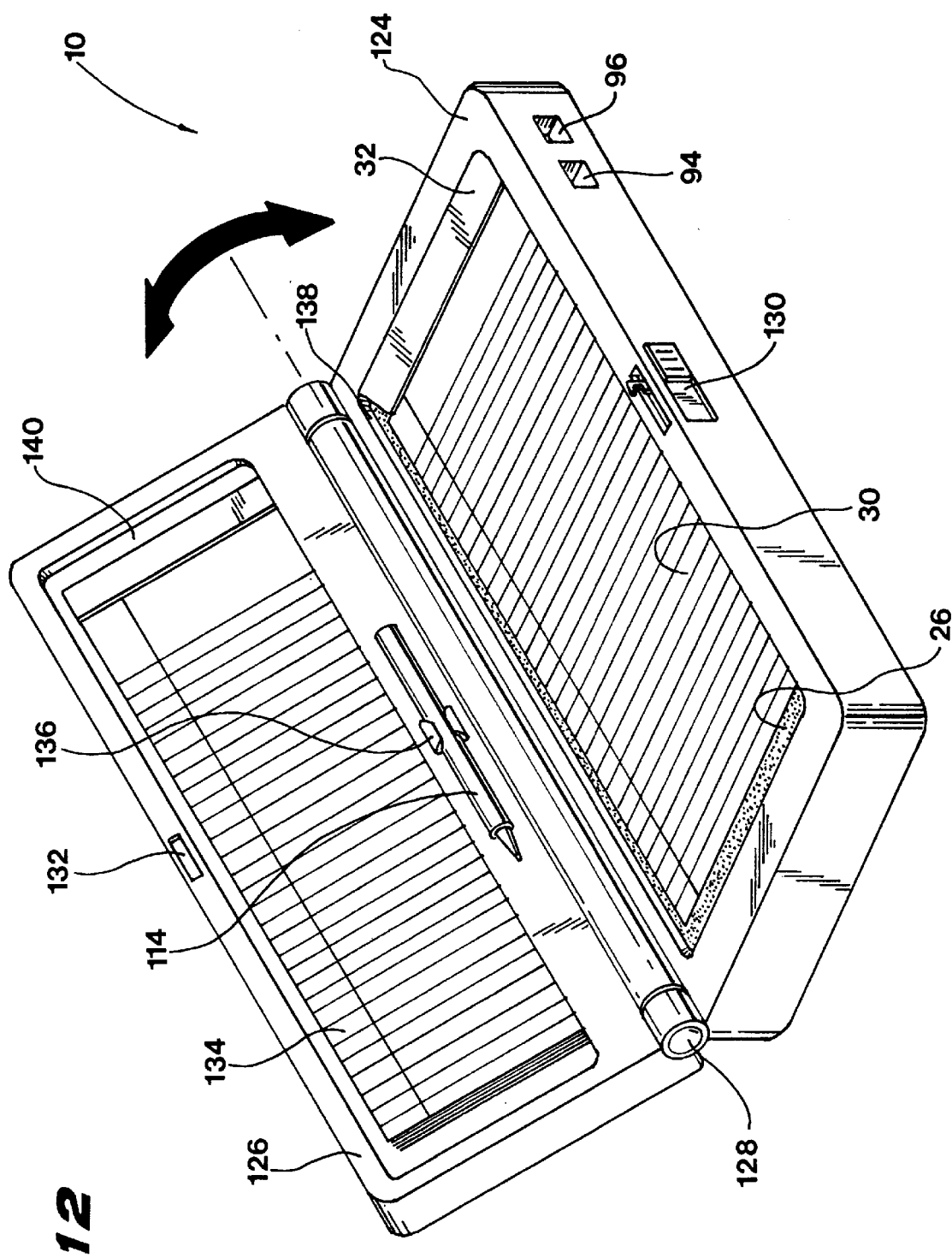
FIG. 12 illustrates the disclosed electronic notepad with a hinged cover.

In another embodiment of the electronic notepad system, a folder-type implementation of electronic notepad 10 is shown in FIG. 12. In this embodiment, electronic notepad 10 includes base portion 124 and cover portion 126. Base portion 124 includes various features as described above for FIGS. 9–11, such as clip 32 for holding sheet of paper 30 substantially adjacent surface 26 of handwriting-capturing device 24, and having at least one data port, such as ports 94, 96 as in FIGS. 9–10, and/or optionally transmitter 116, as in FIG. 11. Means known in the art can be used for connecting cover portion 126 to base portion 124 in a cover/base configuration.

For example, the cover connecting means can include a hinge, such as rotating hinge mechanism 128, as shown in FIG. 12, but can also include a resilient hinge or a resilient flap composed, for example, of bendable plastic. It is also to be understood that other cover connecting means can be used, such as a wire or cable, so that cover portion 126 can be loosely connected to base portion 124.

In the embodiment shown in FIG. 12, electronic notepad 10 can also include means for locking and unlocking base portion 124 and cover portion 126, such as clamp mechanism 130 for engaging complementary slot 132.

Cover portion 126 can include pad 134 for providing multiple sheets of paper, and optionally pen device 114 is attached to and/or removably engages cover portion 126 by a clamp mechanism, such as clasp 136. To provide for a sealed arrangement between base portion 124 and cover portion 126, relief surfaces 138, 140 can be provided with clip 32, paper 30, and surface 26 positioned on first relief surface 138, and pad 134, pen device 114, and clasp 136 positioned on second relief surface 140.

As the sheets of paper from pad 134 are used, at least one sheet of paper is moved from cover portion 126 to be positioned and held in place substantially adjacent to surface 26 by clip 32.

In the embodiments of electronic notepad 10 shown in FIGS. 9–12 and throughout the present disclosure, the means for attaching paper, such as clip 32, can hold multiple sheets of paper at any one time. Thus, the user can save time in positioning multiple pages by clip 32 as opposed to taking one sheet at a time from pad 134. Preferably, the number of sheets attached to the electronic notepad 10 is to be minimized to enhance the electronic capturing of the handwriting by improving, for example, the localized application of capacitance to capacitance-sensitive surface 26 of handwriting-capturing device 24.

For a stack of sheets clipped by clip 32, once one sheet is written on and its writing is stored electronically, the sheet written upon can be folded over clip 32 to allow the user to write on the next sheet in the stack. Alternatively, a sheet of paper written upon can be returned to cover portion 126 for storage, for example, under pad 134 or secured using another clip (not shown in FIG. 12), and the previously written sheet of paper can also be re-inserted into clip 32 for further notes or annotations.

While the disclosed electronic notepad system and method have been particularly shown and described with reference to the preferred embodiments, it is understood by those skilled in the art that various modifications in form and detail can be made therein.

What is claimed is:

1. An electronic notepad for managing electronic copies of handwritten notes, the electronic notepad comprising:
   a handwriting capturing device having a surface for generating data signals corresponding to a plurality of sessions of handwritten notes written substantially adjacent to the surface on a plurality of pages, with each session of handwritten notes including a handwritten page identifier, and the data signals include a respective electronic identifier corresponding to a respective handwritten page identifier; and
   a processor, operatively connected to the surface and responsive to the data signals, for generating the electronic copies of the plurality of sessions in data files, with each electronic copy associated with a respective session and with a respective electronic identifier;
   wherein the electronic identifiers of the plurality of sessions facilitate the management of the electronic copies corresponding to the plurality of pages of handwritten notes.

2. The electronic notepad claim 1 wherein the electronic identifier is associated with a respective session of handwritten notes provided to the surface prior to the providing of a corresponding handwritten identifier to the surface.

3. The electronic notepad claim 1 wherein the electronic identifier is associated with a respective session of handwritten notes provided to the surface subsequent to the providing of a corresponding handwritten identifier to the surface.

4. The electronic notepad of claim 1 wherein the electronic identifier is generated from a scaling of at least a portion of the handwritten notes to be associated with the electronic identifier corresponding to a respective handwritten identifier.

5. The electronic notepad of claim 1 wherein the electronic identifier is generated from a scaling of at least a portion of the handwritten notes selected by a user using an input device for the handwritten notes to be associated with the electronic identifier corresponding to a respective handwritten identifier.

6. The electronic notepad of claim 1 wherein the electronic identifier is generated from a data signal received from a telephone device operatively connected to the processor, wherein the data signal represents a telephone number to be associated with a session of handwritten notes.

7. The electronic notepad of claim 1 wherein the processor is adapted to transfer the electronic copies, with the respective electronic identifiers, to a second processor capable of managing the electronic copies using the electronic identifiers.

8. The electronic notepad of claim 1 wherein the processor is adapted to transfer the electronic copies, with the respective electronic identifiers, to a second processor capable of generating a display of the electronic copies.

9. The electronic notepad of claim 8 further comprising:
   a wireless transmitter, operatively connected to the processor, for transferring the electronic copies to the second processor having a wireless receiver.

10. A system for managing electronic copies of handwritten notes, the system comprising:
    a processor for processing handwritten notes to generate electronic copies, with each electronic copy associated with a respective identifier included within at least one set of the respective handwritten notes, wherein the identifiers facilitate the management of the electronic copies; and
    a handwriting capturing device for capturing the handwritten notes to generate data signals corresponding to the handwritten notes on a plurality of pages, with a set of the handwritten notes including a respective handwritten page identifier;
    the processor processes the handwritten notes by processing the data signals to generate a respective electronic identifier corresponding to a respective handwritten page identifier and associated with the respective electronic copy to facilitate the management of the electronic copies.

11. The system of claim 10 wherein the identifier is associated with a respective set of the handwritten notes provided to the processor subsequent to the providing of the respective identifier to the processor.

12. The system of claim 10 wherein the identifier is associated with a respective set of handwritten notes provided to the processor prior to the providing of the respective identifier to the processor.

13. The system of claim 10 wherein the identifier is generated from a scaling of at least a portion of the handwritten notes to be associated with the identifier.

14. The system of claim 13 wherein the at least a portion of the handwritten notes is selected by a user using an input device.

15. The system of claim 10 wherein the identifier is generated from a data signal from a telephone device operatively connected to the processor to be associated with a set of handwritten notes.

16. The system of claim 10 wherein the processor is adapted to transfer the electronic copies, with the respective electronic identifiers, to a second processor capable of managing the electronic copies using the electronic identifiers.

17. The system of claim 10 wherein the processor further includes:
means for managing the electronic copies by merging pairs of electronic copies having similar electronic identifiers.

18. The system of claim 17 wherein the managing means, responsive to a selection signal received from the user to select a pair of electronic identifiers as being similar, merges the pair of electronic copies corresponding to the selected pair of electronic identifiers.

19. The system of claim 17 wherein the managing means, responsive to an automerge setting, automatically compares pairs of electronic identifiers to determine a condition of similarity between respective pairs, and automatically merges a pair of electronic copies corresponding to a pair of electronic identifiers having the condition of substantial similarity.

20. The system of claim 19 wherein the managing means includes:
measuring means for determining a similarity measure from respective pairs of electronic identifiers; and
threshold means for determining the condition of similarity from the similarity measure exceeding a predetermined threshold.

21. A system for managing electronic copies of handwritten notes, the system comprising:
an electronic notepad including:
a handwriting-capturing device having a surface for generating data signals corresponding to a plurality of sessions of handwritten notes written substantially adjacent to the surface on a plurality of pages, with each session of handwritten notes including a handwritten page identifier, and the data signals include a respective electronic identifier corresponding to a respective handwritten page identifier;
a first processor, operatively connected to the surface and responsive to the data signals, for generating the electronic copies of the plurality of sessions in data files, with each electronic copy associated with a respective session and with a respective electronic identifier; and
means for transferring the electronic copies from the first processor; and
a processing unit including:
means for receiving the electronic copies from the electronic notepad;
a second processor for processing the electronic copies; and
a note managing program, executed by the second processor, for using the electronic identifiers of the plurality of sessions to facilitate the management of the electronic copies corresponding to the plurality of pages of handwritten notes.

22. The system of claim 21 wherein the note managing program manages the electronic copies by merging pairs of electronic copies having similar electronic identifiers.

23. The system of claim 22 wherein the note managing program, responsive to a selection signal received from the user to select a pair of electronic identifiers as being similar, merges the pair of electronic copies corresponding to the selected pair of electronic identifiers.

24. The system of claim 22 wherein the note managing program, responsive to an automerge setting, automatically compares pairs of electronic identifiers to determine a condition of similarity between respective pairs, and automatically merges a pair of electronic copies corresponding to a pair of electronic identifiers having the condition of substantial similarity.

25. The system of claim 24 wherein the managing means includes:
measuring means for determining a similarity measure from respective pairs of electronic identifiers; and
threshold means for determining the condition of similarity from the similarity measure exceeding a predetermined threshold.

26. A method for managing electronic copies of handwritten notes, the method comprising the steps of:
receiving handwritten notes on a plurality of sheets of paper, wherein such handwritten notes include a handwritten identifier on a respective sheet of paper;
generating electronic copies of each sheet of paper having the handwritten notes, wherein each electronic copy includes an electronic identifier corresponding to the handwritten identifier;
providing the electronic copies, including the electronic identifiers, to a processor; and
managing the electronic copies using the electronic identifiers to correlate the electronic copies with the respective sheets of paper having the handwritten notes.

27. The method of claim 26 wherein the step of providing the electronic copies includes the step of downloading the electronic copies as data signals to a processor.

28. The method of claim 26 wherein the step of receiving the handwritten notes includes the steps of receiving a capacitive effect from the surface being capacitance-sensitive; and
the step of generating the electronic copies includes the steps of converting the received capacitive effect to corresponding data signals as the electronic copies.

29. The method of claim 26 wherein the step of managing the electronic copies includes the steps of:
comparing the electronic identifiers; and
merging a pair of electronic copies upon a determination of the corresponding electronic identifiers as being similar.

* * * * *